(12) United States Patent
Lin

(10) Patent No.: US 11,773,635 B2
(45) Date of Patent: Oct. 3, 2023

(54) HINGE MODULE AND ELECTRONIC DEVICE

(71) Applicant: QISDA CORPORATION, Taoyuan (TW)

(72) Inventor: Chih-Ying Lin, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 333 days.

(21) Appl. No.: 17/155,028

(22) Filed: Jan. 21, 2021

(65) Prior Publication Data

US 2021/0254381 A1      Aug. 19, 2021

(30) Foreign Application Priority Data

Feb. 19, 2020   (CN) .......................... 202010105834.4

(51) Int. Cl.
  *E05D 11/08*   (2006.01)
  *E05D 5/14*   (2006.01)
  *E05D 7/00*   (2006.01)

(52) U.S. Cl.
  CPC .............. *E05D 11/087* (2013.01); *E05D 5/14* (2013.01); *E05D 7/0054* (2013.01); *E05Y 2900/606* (2013.01)

(58) Field of Classification Search
  CPC ..... E05D 11/08; E05D 11/087; E05D 11/081; E05D 11/082; E05D 11/084; E05D 2011/085; E05D 2011/088; E05D 7/0054; E05D 2007/0063; E05D 5/14; F16C 11/103
  See application file for complete search history.

(56) References Cited

U.S. PATENT DOCUMENTS

| | | | | |
|---|---|---|---|---|
| 5,154,382 A * | 10/1992 | Hoshino | ................ | F16M 11/10 248/185.1 |
| 5,689,855 A * | 11/1997 | Tang | ..................... | E05D 7/0054 16/242 |
| 7,597,302 B2 * | 10/2009 | Lee | .................... | F16M 11/2021 248/371 |
| 7,735,198 B2 * | 6/2010 | Petermann | ............. | F16M 11/06 16/342 |
| 9,644,412 B2 * | 5/2017 | Novin | ....................... | E05D 3/02 |
| 10,000,955 B2 * | 6/2018 | Shang | ................... | G06F 1/1681 |
| 10,175,730 B2 * | 1/2019 | Lin | ........................ | G06F 1/1681 |
| 10,267,075 B2 * | 4/2019 | Kenyon | .................... | E05D 3/02 |
| 10,324,501 B1 * | 6/2019 | Zimmerman | ......... | G06F 1/1681 |
| 10,344,510 B2 * | 7/2019 | Siddiqui | ............... | G06F 1/1618 |
| 10,533,358 B2 * | 1/2020 | Naganuma | ............ | E05D 11/087 |
| 10,809,772 B1 * | 10/2020 | Wang | .................... | G06F 1/1681 |
| 11,099,612 B2 * | 8/2021 | Sanchez | ................. | E05D 11/08 |
| 11,530,561 B2 * | 12/2022 | Oldani | .................. | E05D 11/087 |
| 2012/0124775 A1 * | 5/2012 | Ceci | ...................... | G06F 1/1681 16/342 |
| 2018/0347620 A1 * | 12/2018 | Yanus | .................... | F04B 53/006 |
| 2022/0065012 A1 * | 3/2022 | Lin | ..................... | E05D 11/1007 |

* cited by examiner

Primary Examiner — Jeffrey O'Brien

(57) ABSTRACT

A hinge module includes a plurality of discs, a plurality of friction plates and a restraining member. The discs are eccentrically connected to each other. Each of the friction plates has a circular hole, each of the friction plates is rotatably disposed on one of the discs through the circular hole, and the friction plates contact each other. The restraining member is disposed on the friction plates.

18 Claims, 15 Drawing Sheets

HINGE MODULE AND ELECTRONIC DEVICE

BACKGROUND OF THE INVENTION

1. Field of the Invention

The invention relates to a hinge module and an electronic device for providing friction force in rotation direction and, more particularly, to a hinge module capable of improving frictional locking force and durability and an electronic device equipped with the hinge module.

2. Description of the Prior Art

A type of hinge is used to rotatably connect two components and allows the components to freely rotate with respect to each other according to some purposes, such as a hinge for a door or a window. Another type of hinge is used to rotatably connect two components and provides stable dynamic or static friction force in rotation direction, wherein this type of hinge may be called friction hinge. The friction hinge generates friction force by internal structures thereof, such that the friction hinge can provide a dynamic friction force in rotation direction when a device is pushed to rotate by a user. Furthermore, the friction hinge can provide a static friction force in rotation direction to retain and lock the device at a desired position after the user releases the device. The friction hinge is usually applied to a lighting fixture, a monitor, a notebook computer, and so on for the user to adjust an orientation of the device. The conventional friction hinge may be classified into two types according to a position of a friction surface. The first type provides friction force through surface contact and rotation between interior and exterior cylinders, wherein the friction force is associated with a contact area and a radial force between the interior and exterior cylinders. Accordingly, if a diameter of a shaft of the friction hinge is small, the dynamic friction force and the maximum static friction force (or so-called locking force) will be limited. Still further, the interior and exterior cylinders need to be processed precisely to ensure stability of friction. The second type uses a circular washer to provide a friction surface and uses a spring washer, a bolt and a nut to provide an axial force. When a large friction force is required, a diameter of the washer may be enlarged or the number of washers may be increased. However, the washer with too large diameter will increase a total diameter of the shaft and too many washers will increase an axial thickness of the shaft. Moreover, the components are complicated and have too many contact surfaces, such that the friction force of the shaft may decay and become unstable after being used for a certain period of time.

SUMMARY OF THE INVENTION

An objective of the invention is to provide a hinge module capable of improving frictional locking force and durability and an electronic device equipped with the hinge module, so as to solve the aforesaid problems.

According to an embodiment of the invention, a hinge module comprises a plurality of discs, a plurality of friction plates and a restraining member. The discs are eccentrically connected to each other. Each of the friction plates has a circular hole, each of the friction plates is rotatably disposed on one of the discs through the circular hole, and the friction plates contact each other. The restraining member is disposed on the friction plates.

According to another embodiment of the invention, an electronic device comprises a hinge module and an electronic unit. The hinge module comprises a plurality of discs, a plurality of friction plates and a restraining member. The discs are eccentrically connected to each other. Each of the friction plates has a circular hole, each of the friction plates is rotatably disposed on one of the discs through the circular hole, and the friction plates contact each other. The restraining member is disposed on the friction plates. The electronic unit is disposed on the hinge module.

As mentioned in the above, the invention disposes the friction plates on the eccentric discs to form a crank-like structure. When an external force is exerted on both sides of the hinge module to rotate the hinge module, the friction plates are driven to move by the eccentric discs, such that a relative displacement is generated between every two adjacent friction plates. When each of the friction plates is clamped tightly from a direction perpendicular to a contact surface of the friction plate, each of the friction plates generates a friction force to resist the relative displacement, so as to resist the external force of rotating the hinge module. After the position adjustment is finished and the hinge module is released by the user, the hinge module is locked at the desired position.

The total friction force between the surfaces of two objects can be calculated by multiplying a contact force by a contact area and a coefficient of friction. In the invention, the friction surface for providing friction force is located beyond a shaft of the hinge module (i.e. the discs), so there are more space for arranging larger frictional contact area under the limitation of identical diameter and thickness of the shaft. For example, if a large locking force is required, the length of the friction plate may be increased to increase the frictional contact area, so as to provide larger friction force without increasing the diameter or axial thickness of the shaft. Furthermore, if a stable friction force without decay is required to be used for a certain period of time, the contact force of the friction surface cannot be too large, so as to prevent the friction surface from being abraded due to large friction force. When the friction area can be increased as large as possible, the contact force of the friction plate can be decreased to obtain identical total friction force. Accordingly, the invention can improve the locking force and durability of the hinge module under the limitation of identical diameter and thickness of the shaft.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
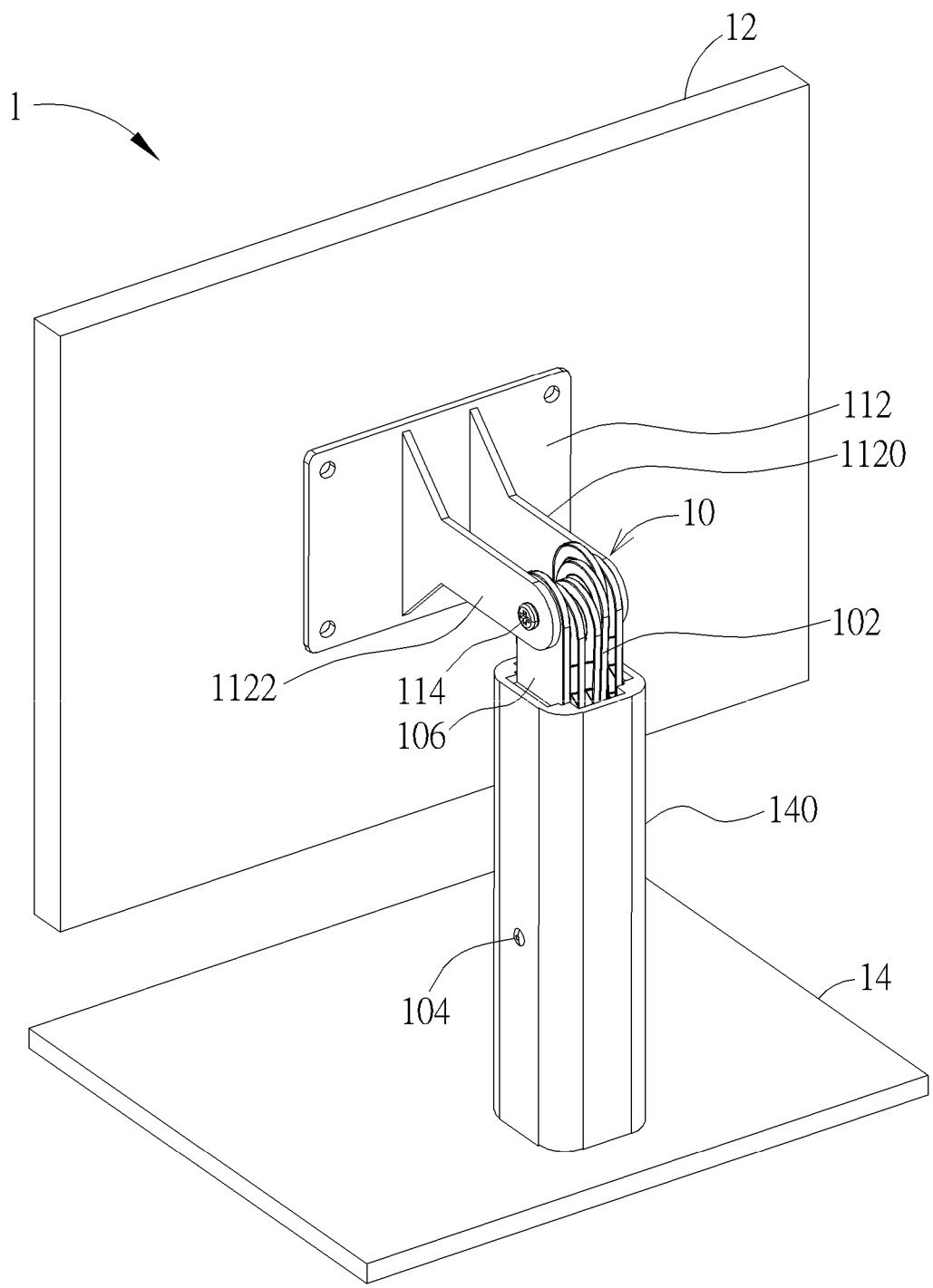
FIG. 1 is a perspective view illustrating an electronic device according to an embodiment of the invention.
Figure 2:
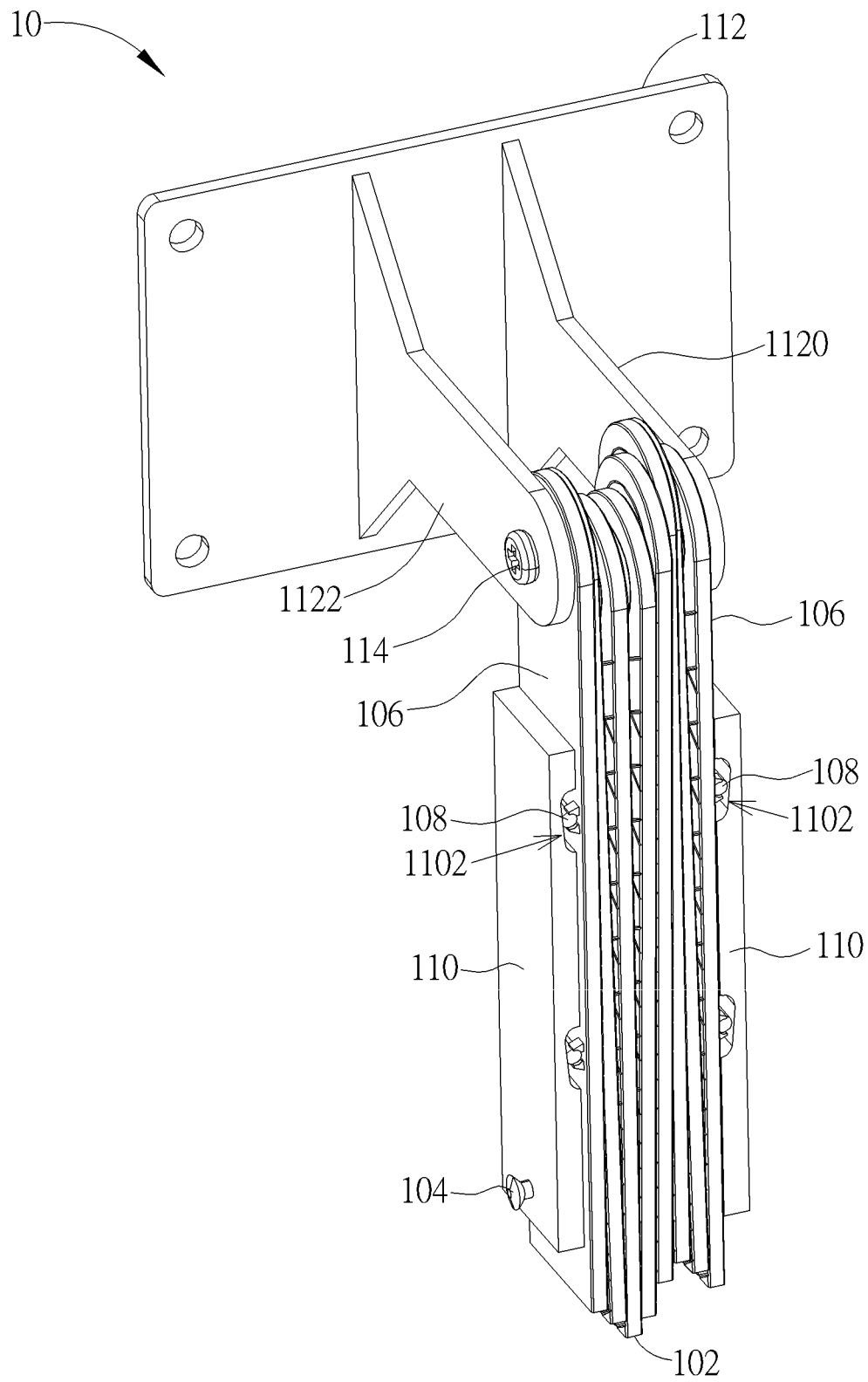
FIG. 2 is a perspective view illustrating the hinge module shown in FIG. 1.
Figure 3:
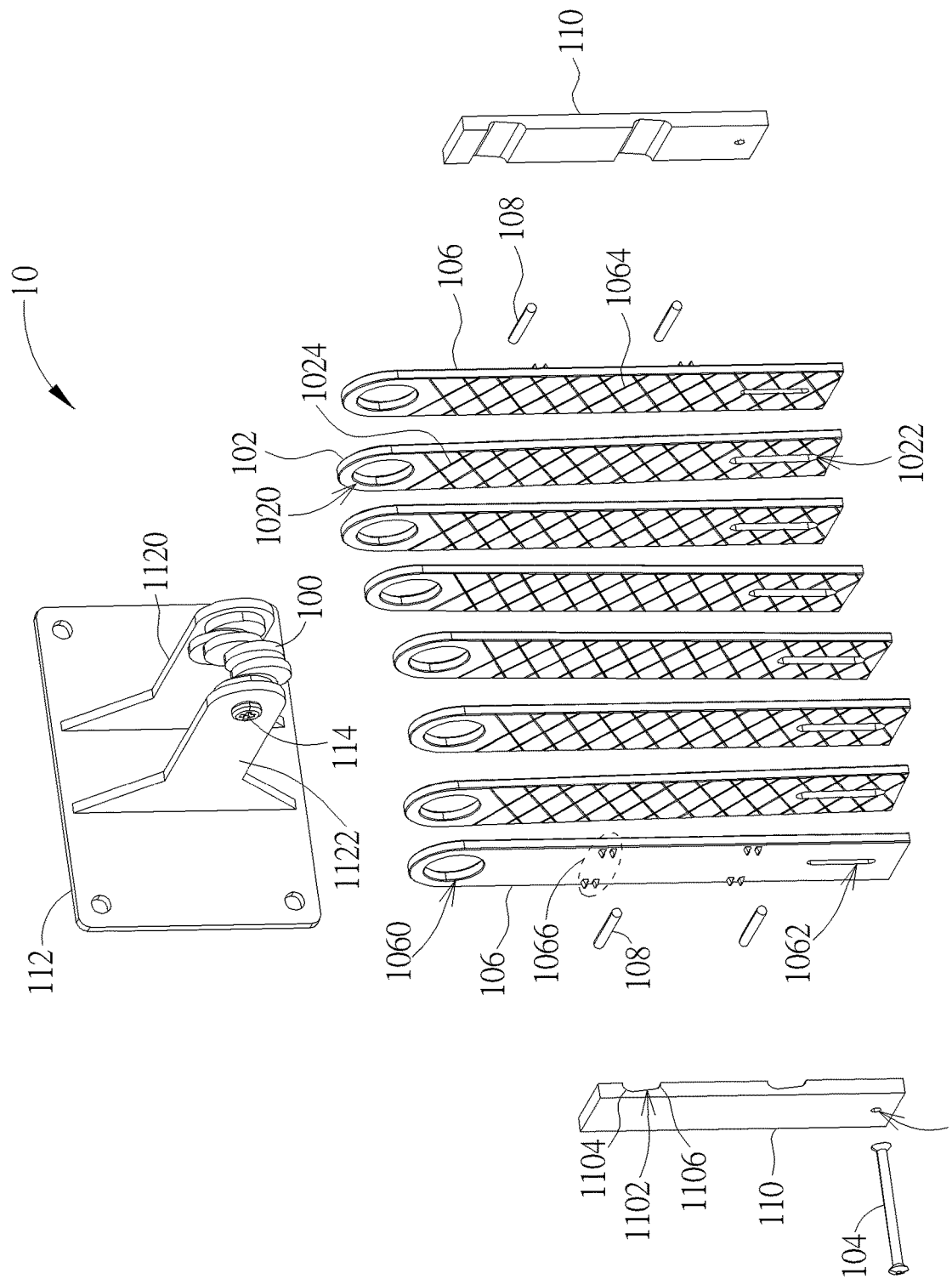
FIG. 3 is an exploded view illustrating the hinge module shown in FIG. 2.
Figure 4:
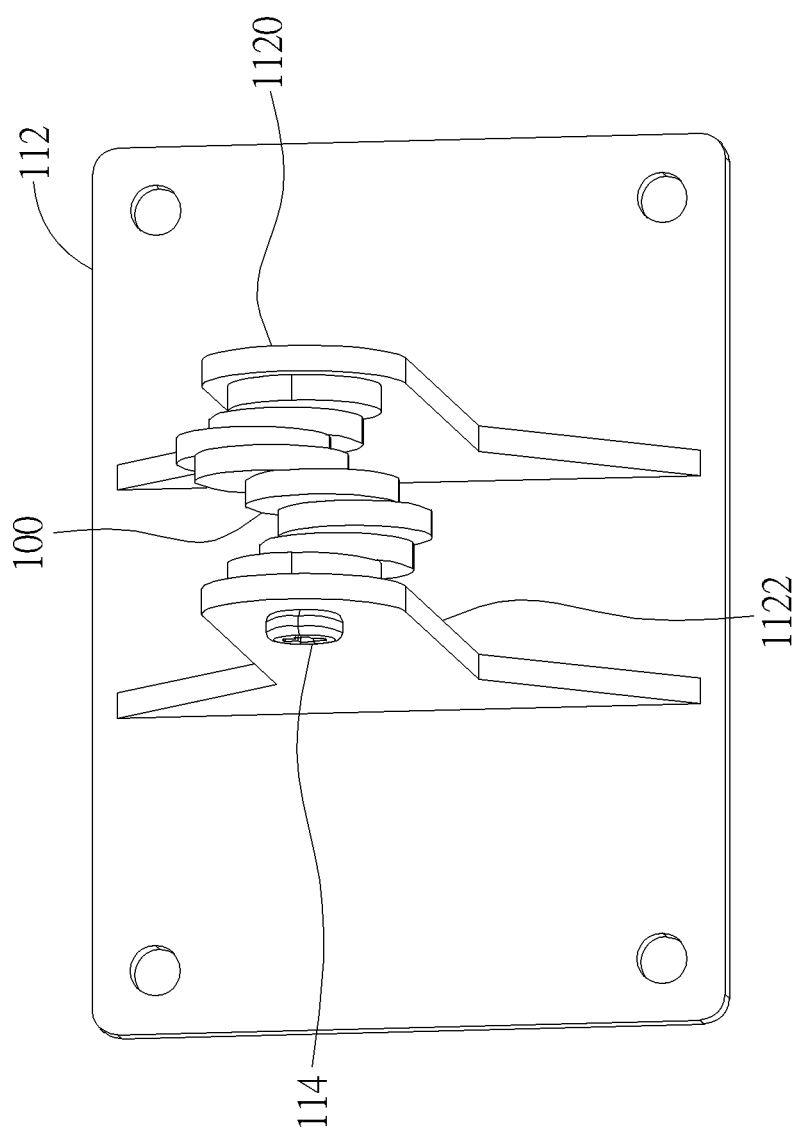
FIG. 4 is a perspective view illustrating the discs and the support member shown in FIG. 3.
Figure 5:
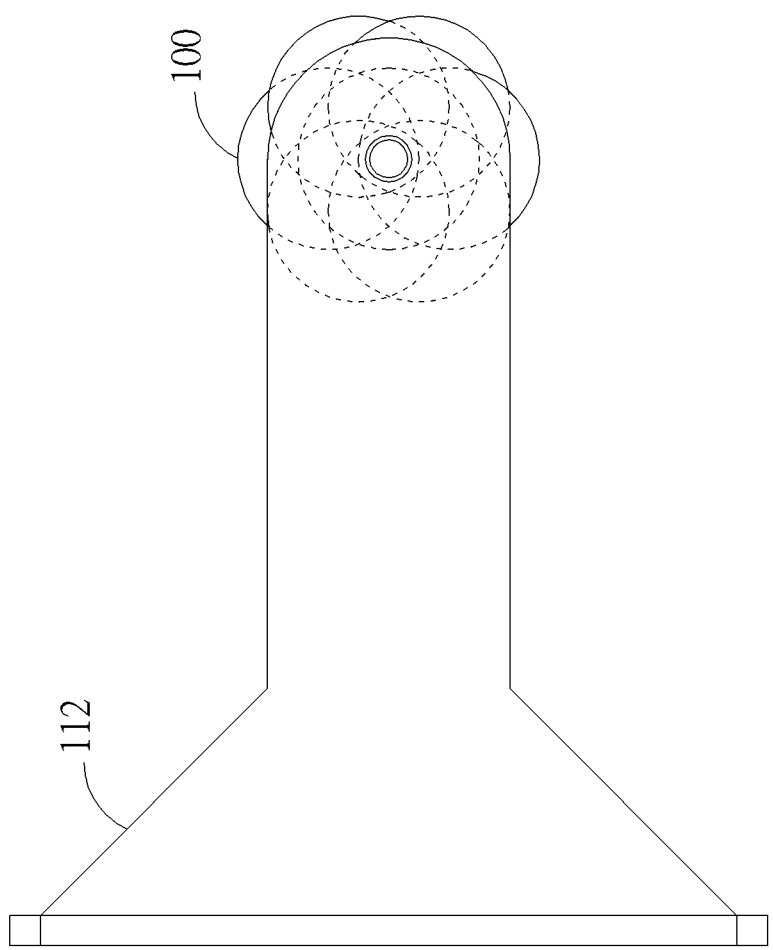
FIG. 5 is a side view illustrating the discs and the support member shown in FIG. 4.
Figure 6:
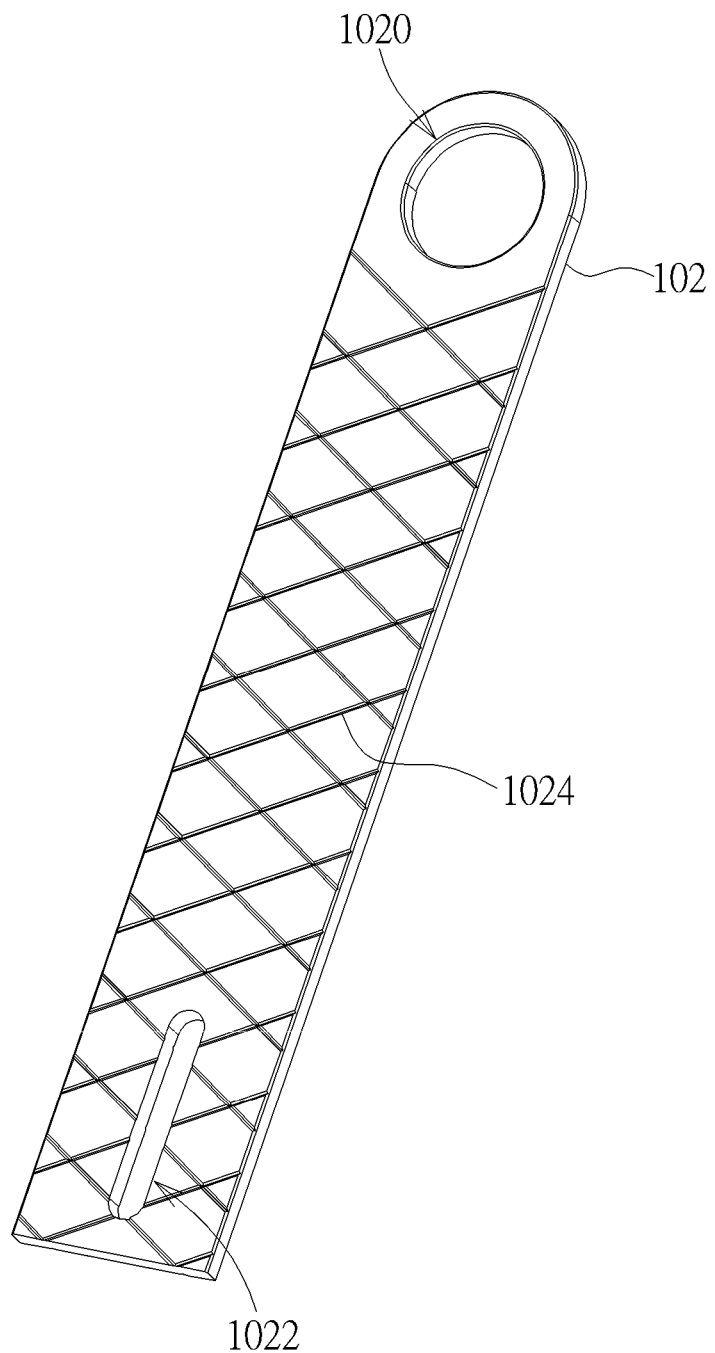
FIG. 6 is a perspective view illustrating the friction plate shown in FIG. 3.
Figure 7:
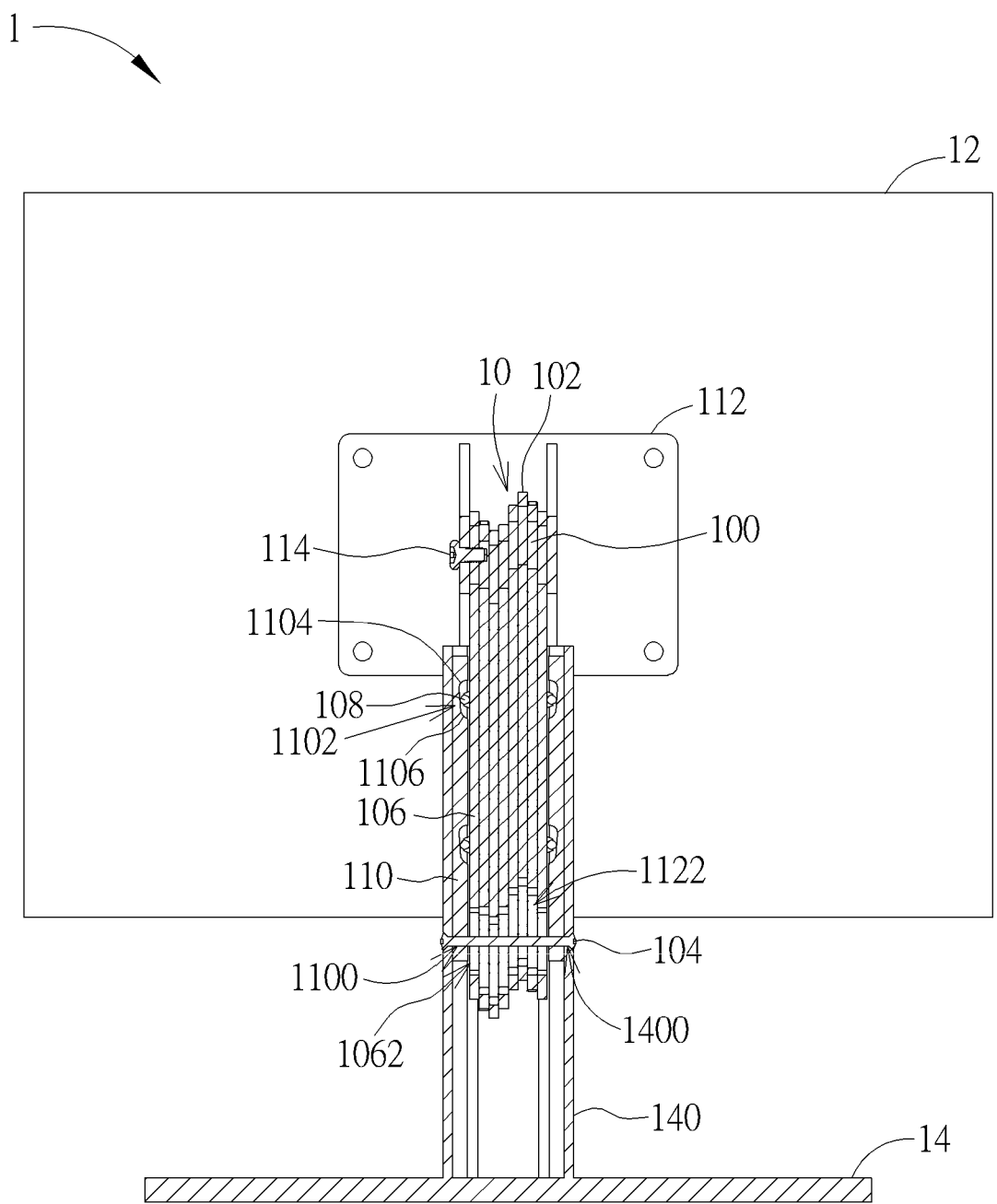
FIG. 7 is a sectional view illustrating the electronic device shown in FIG. 1.
Figure 8:
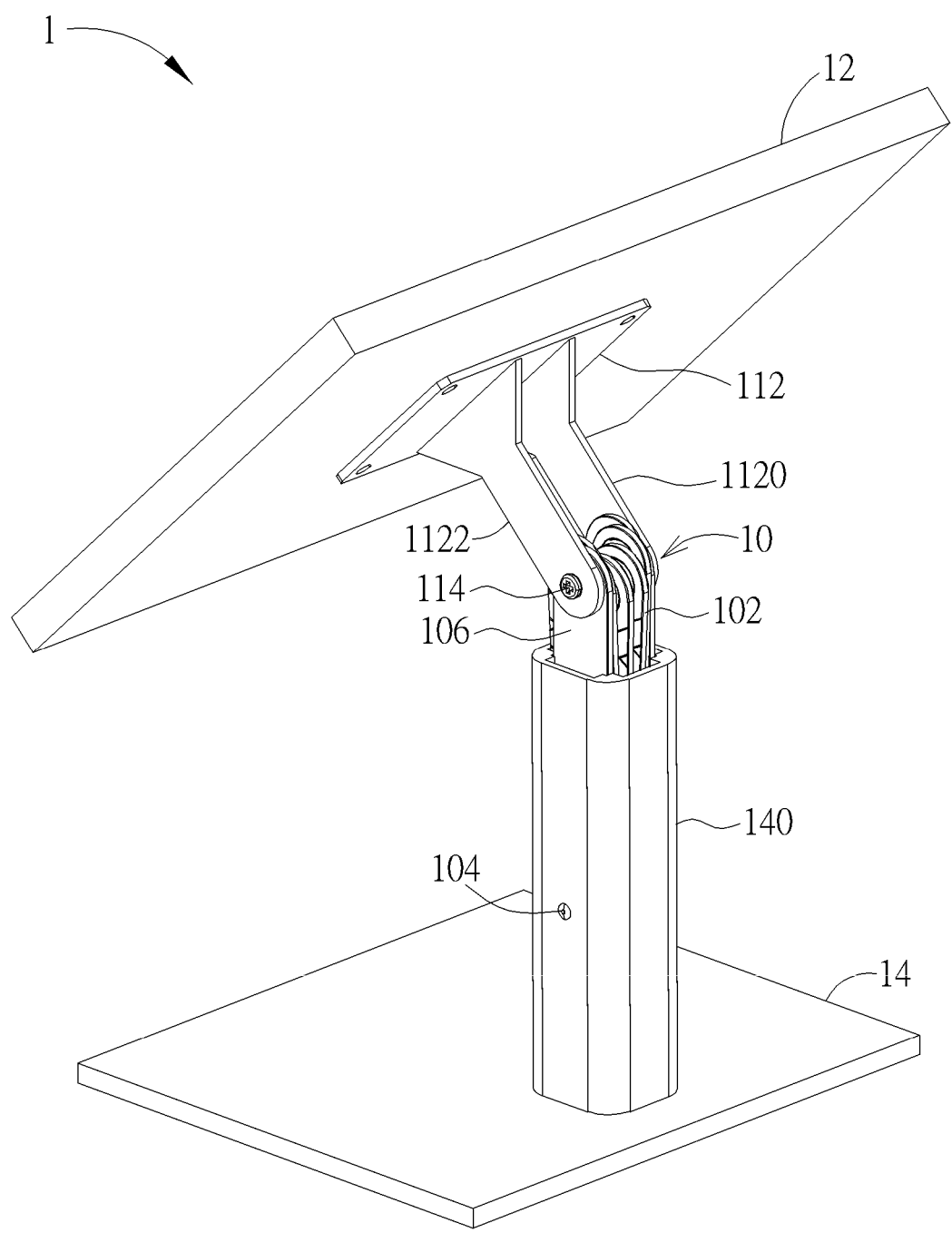
FIG. 8 is a perspective view illustrating the orientation of the electronic unit shown in FIG. 1 being adjusted by the hinge module.
Figure 9:
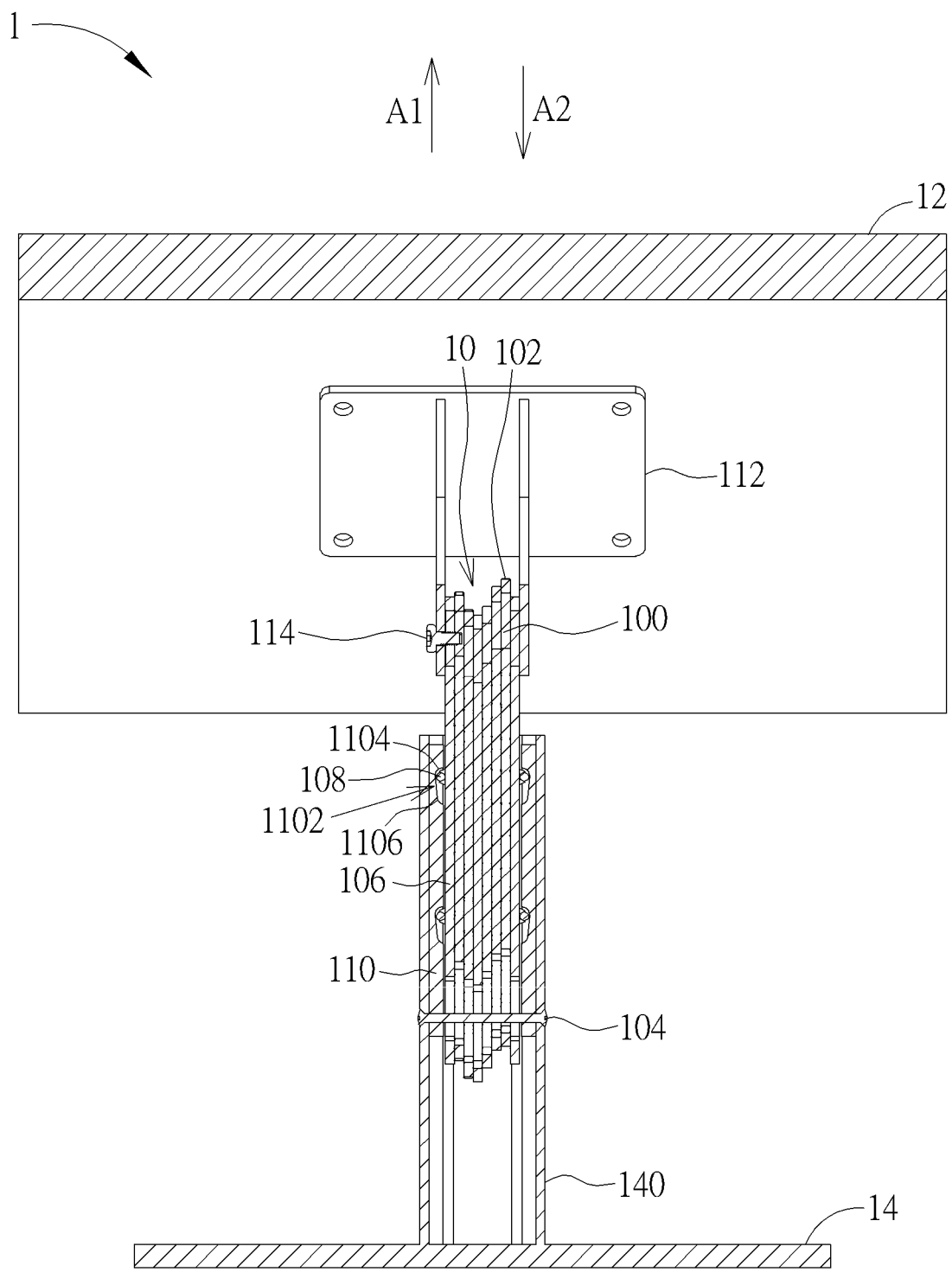
FIG. 9 is a sectional view illustrating the electronic device shown in FIG. 8.

Referring to FIGS. 1 to 9, FIG. 1 is a perspective view illustrating an electronic device 1 according to an embodiment of the invention, FIG. 2 is a perspective view illustrating the hinge module 10 shown in FIG. 1, FIG. 3 is an exploded view illustrating the hinge module 10 shown in FIG. 2, FIG. 4 is a perspective view illustrating the discs 100 and the support member 112 shown in FIG. 3, FIG. 5 is a side view illustrating the discs 100 and the support member 112 shown in FIG. 4, FIG. 6 is a perspective view illustrating the friction plate 102 shown in FIG. 3, FIG. 7 is a sectional view illustrating the electronic device 1 shown in FIG. 1, FIG. 8 is a perspective view illustrating the orientation of the electronic unit 12 shown in FIG. 1 being adjusted by the hinge module 10, and FIG. 9 is a sectional view illustrating the electronic device 1 shown in FIG. 8.

As shown in FIG. 1, the electronic device 1 comprises a hinge module 10, an electronic unit 12 and a support base 14. The electronic unit 12 is disposed on the hinge module 10, such that an orientation of the electronic unit 12 may be adjusted by the hinge module 10. In this embodiment, the support base 14 may comprise a sleeve 140 and the hinge module 10 may be inserted into the sleeve 140. In this embodiment, the electronic unit 12 may be, but not limited to, a display module (e.g. liquid crystal display, plasma display, organic light emitting diode display and so on. In another embodiment, the electronic unit 12 may also be a light emitting module (e.g. lighting fixture). In another embodiment, the electronic unit 12 may also be replaced by other objects disposed on the hinge module 10. In other words, the hinge module 10 is not limited to cooperate with the electronic unit 12 to form the electronic device 1.

As shown in FIGS. 2 and 3, the hinge module 10 comprises a plurality of discs 100, a plurality of friction plates 102, a restraining member 104, two clamping members 106, a plurality of movable members 108, two covers 110 and a support member 112. The discs 100 are fixed on the support member 112. In this embodiment, eight discs 100 are fixed on the support member 112. It should be noted that the number of discs 100 may be determined according to practical applications, so the invention is not limited to the embodiment shown in the figures. Furthermore, the aforesaid electronic unit 12 may be disposed on the support member 112, such that the electronic unit 12 may drive the discs 100 to rotate through the support member 112.

As shown in FIGS. 4 and 5, the discs 100 are eccentrically connected to each other. In this embodiment, every two adjacent discs 100 may have an identical eccentric angle and an identical eccentric amount. For example, as shown in FIG. 5, the eccentric angle between every two adjacent discs 100 may be, but not limited to, 60 degrees. In another embodiment, every two adjacent discs 100 may also have different eccentric angle and different eccentric amount. In other words, the eccentric angle and the eccentric amount between every two adjacent discs 100 may be determined according to practical applications, so the invention is not limited to the embodiment shown in the figures.

As shown in FIGS. 3 and 6, each of the friction plates 102 has a circular hole 1020 and a first longitudinal hole 1022. Each of the friction plates 102 may be rotatably disposed on one of the discs 100 through the circular hole 1020, such that the friction plates 102 contact each other, as shown in FIG. 2. In this embodiment, the discs 100 may be fixed on a fixing portion 1120 of the support member 112 and another fixing portion 1122 of the support member 112 may be movable with respect to the discs 100. Accordingly, when the friction plates 102 and the discs 100 are being assembled, an operator may pull the fixing portion 1122 away from the discs 100 first and then sleeve the friction plates 102 on the discs 100, respectively. Then, the operator may use screws 114 or other fixing members to fix the fixing portion 1122 on the discs 100. Furthermore, a surface of the each of the friction plates 102 may have an uneven structure 1024. In this embodiment, the uneven structure 1024 may comprise a plurality of recesses. In another embodiment, the uneven structure 1024 may comprise a plurality of protrusions or other scraggy structures according to practical applications. When the friction plates 102 are stacked with each other, the uneven structure 1024 may prevent the adjacent friction plates 102 from being attracted by vacuum, so as to stabilize the coefficient of friction.

As shown in FIGS. 2 and 3, the two clamping members 106 are disposed at opposite sides of the friction plates 102. In this embodiment, each of the clamping members 106 may also have a circular hole 1060, such that the two clamping members 106 may be disposed on two most outside discs 100 through the circular hole 1060. Furthermore, each of the clamping members 106 has a second longitudinal hole 1062. The restraining member 104 is inserted into the first longitudinal hole 1022 and the second longitudinal hole 1062, so as to be disposed on the friction plates 102 and the clamping members 106. The restraining member 104 may be a screw, a rivet or the like. In this embodiment, a surface of the clamping member 106 facing the friction plate 102 may also have an uneven structure 1064 (e.g. the aforesaid recesses, protrusions or other scraggy structures). When the clamping member 106 and the friction plate 102 are stacked with each other, the uneven structure 1064 may prevent the clamping member 106 and the friction plate 102 from being attracted by vacuum, so as to stabilize the coefficient of friction. Moreover, another surface of the clamping member 106 facing the cover 110 may have a plurality of engaging structures 1066. Each of the movable members 108 may be engaged in the corresponding engaging structure 1066, such that the movable members 108 may be movably disposed on the clamping members 106. In this embodiment, the movable members 108 may be rotatably disposed on the clamping members 106, but is not so limited.

The two covers 110 are disposed at opposite sides of the two clamping members 106. Each of the covers 110 has a through hole 1100 and the restraining member 104 is inserted into the through hole 1100. The two covers 110 have a plurality of wedge-shaped recesses 1102, wherein each of the wedge-shaped recesses 1102 has a wide end 1104 and a narrow end 1106. When the two covers 110 are disposed at opposite sides of the two clamping members 106, each of the movable members 108 is accommodated in one of the wedge-shaped recesses 1102, as shown in FIG. 2.

As shown in FIG. 7, when the movable member 108 is located at the narrow end 1106 of the wedge-shaped recess 1102, the clamping member 106 is forced by the movable member 108 to clamp the friction plates 102 tightly. At this time, the discs 100 and the support member 112 cannot rotate due to the friction force between the friction plates 102, such that the orientation of the electronic unit 12 is fixed, as shown in FIG. 1.

When a user wants to adjust the orientation of the electronic unit 12, the user needs to lift the electronic unit 12 toward a direction of an arrow A1 shown in FIG. 9. At this time, the movable member 108 moves with the clamping member 106 from the narrow end 1106 of the wedge-shaped recess 1102 to the wide end 1104 of the wedge-shaped recess 1102. When the movable member 108 is located at the wide end 1104 of the wedge-shaped recess 1102, the two clamping members 106 release the friction plates 102. Then, the user may rotate the electronic unit 12 to adjust the orientation of the electronic unit 12. After the adjustment is finished, the user may release the electronic unit 12, such that the hinge module 10 moves toward a direction of an arrow A2 shown in FIG. 9. The movable member 108 moves with the clamping member 106 from the wide end 1104 of the wedge-shaped recess 1102 to the narrow end 1106 of the wedge-shaped recess 1102. At this time, the clamping member 106 is forced by the movable member 108 to clamp the friction plates 102 tightly, such that the orientation of the electronic unit 12 is fixed, as shown in FIG. 8.

Figure 10:
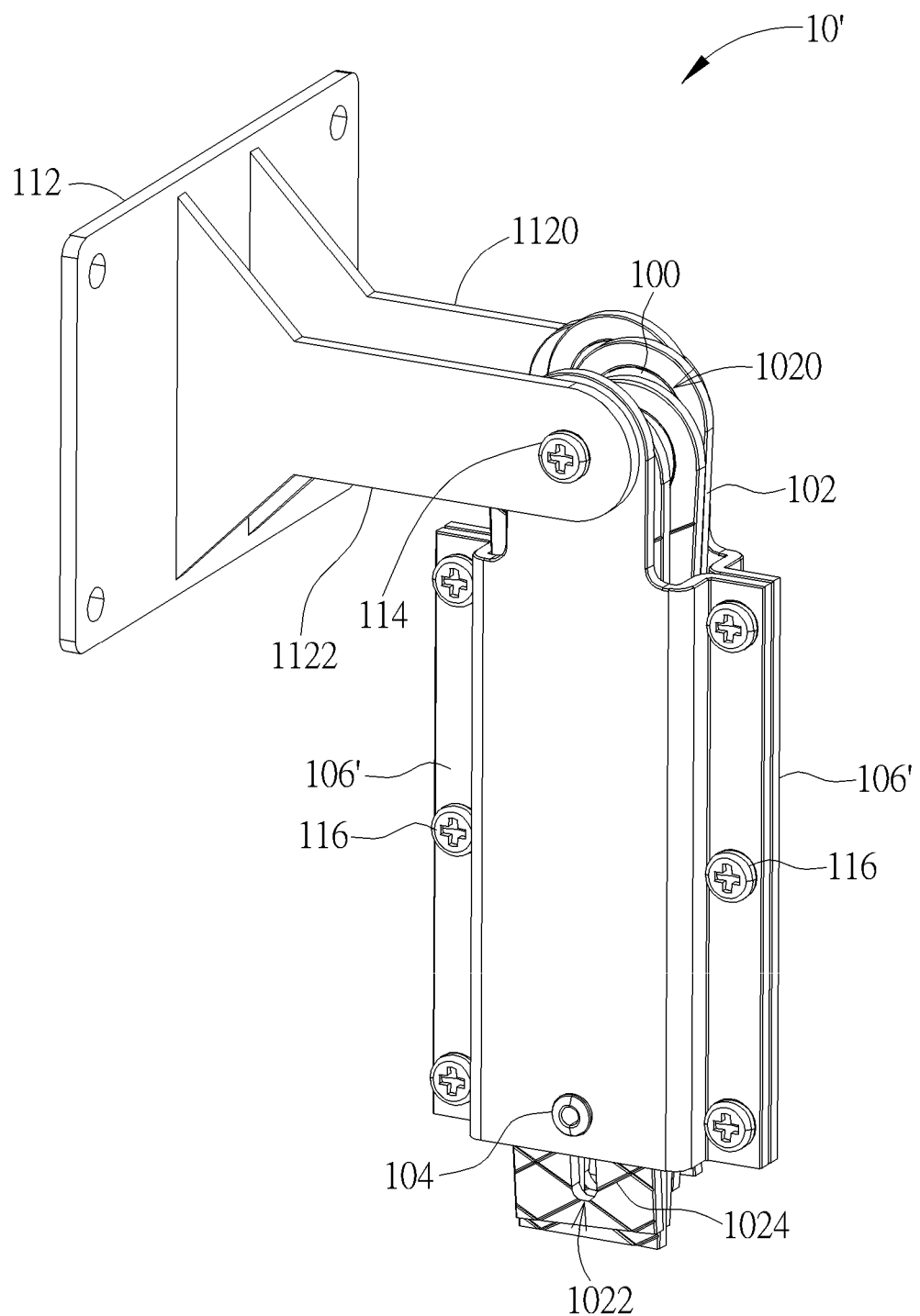
FIG. 10 is a perspective view illustrating a hinge module according to another embodiment of the invention.
Figure 11:
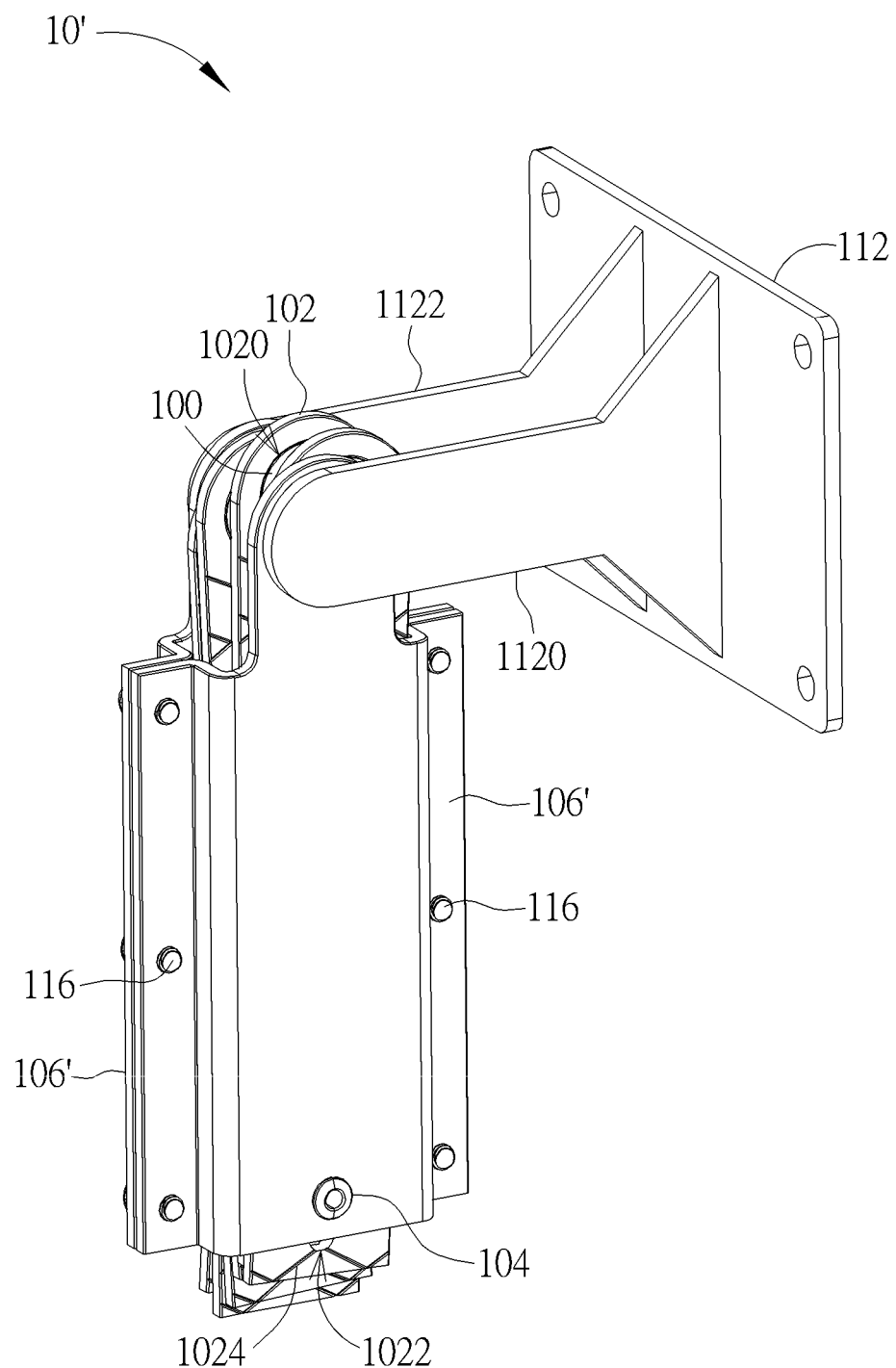
FIG. 11 is a perspective view illustrating the hinge module shown in FIG. 10 from another viewing angle.
Figure 12:
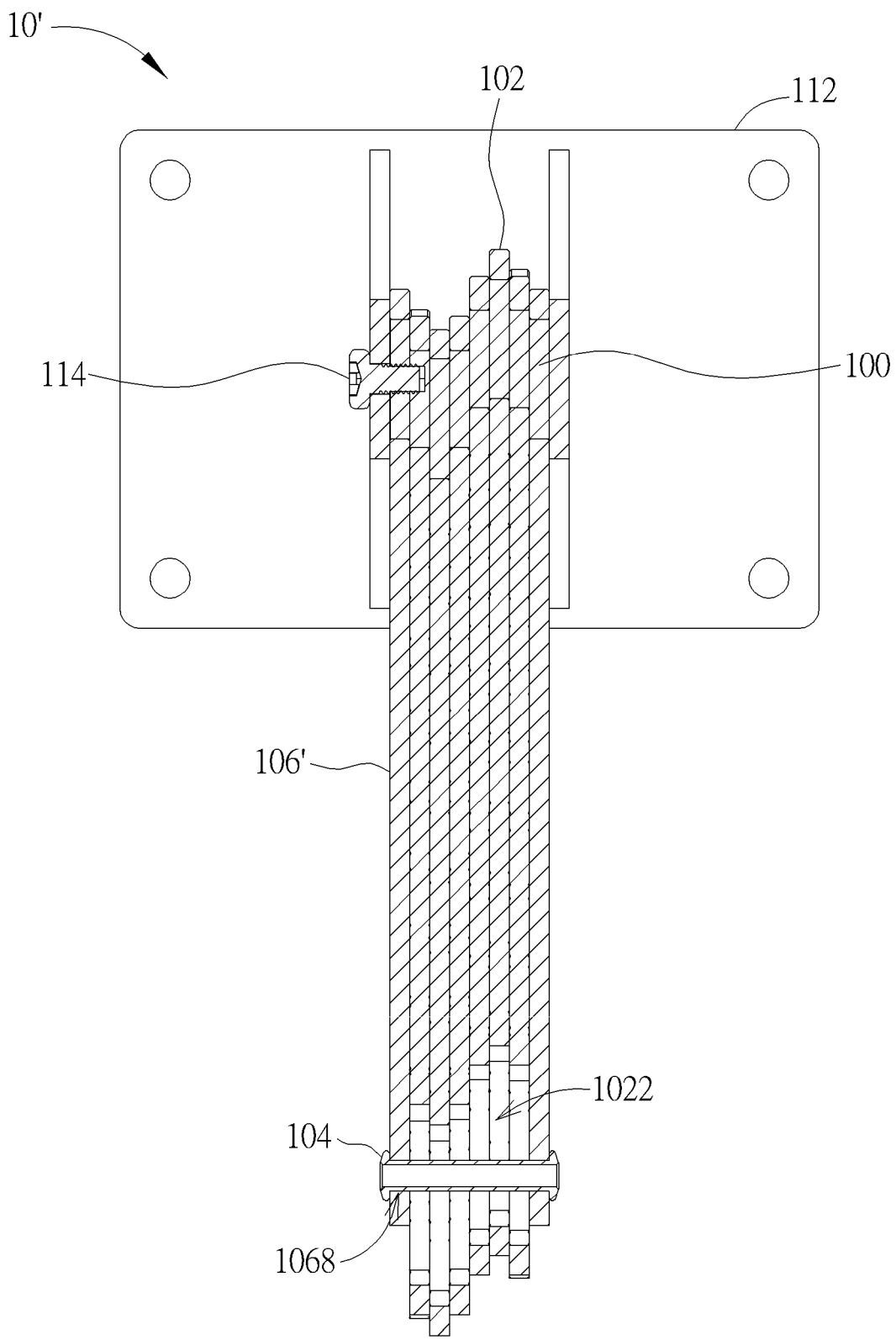
FIG. 12 is a sectional view illustrating the hinge module shown in FIG. 10.

Referring to FIGS. 10 to 12, FIG. 10 is a perspective view illustrating a hinge module 10' according to another embodiment of the invention, FIG. 11 is a perspective view illustrating the hinge module 10' shown in FIG. 10 from another viewing angle, and FIG. 12 is a sectional view illustrating the hinge module 10' shown in FIG. 10.

The main difference between the hinge module 10' and the aforesaid hinge module 10 is that the clamping member 106' of the hinge module 10' is different from the clamping member 106 of the hinge module 10. As shown in FIGS. 10 and 11, the hinge module 10' comprises two clamping members 106' and a plurality of connecting members 116. In this embodiment, the connecting members 116 may be screws. The two clamping members 106' are disposed at opposite sides of the friction plates 102. Each of the clamping members 106' has a through hole 1068 and the restraining member 104 is inserted into the through hole 1068. The connecting members 116 are configured to connect the two clamping members 106'. When the connecting members 116 are fixed tightly, the two clamping members 106' clamp the friction plates 102 tightly. At this time, the discs 100 and the support member 112 cannot rotate due to the friction force between the friction plates 102. When the connecting members 116 are released, the two clamping members 106' release the friction plates 102, such that the discs 100 and the support member 112 can rotate to drive the friction plates 102 to move with respect to each other. It should be noted that the same elements in FIGS. 10-12 and FIGS. 1-9 are represented by the same numerals, so the repeated explanation will not be depicted herein again.

Figure 13:
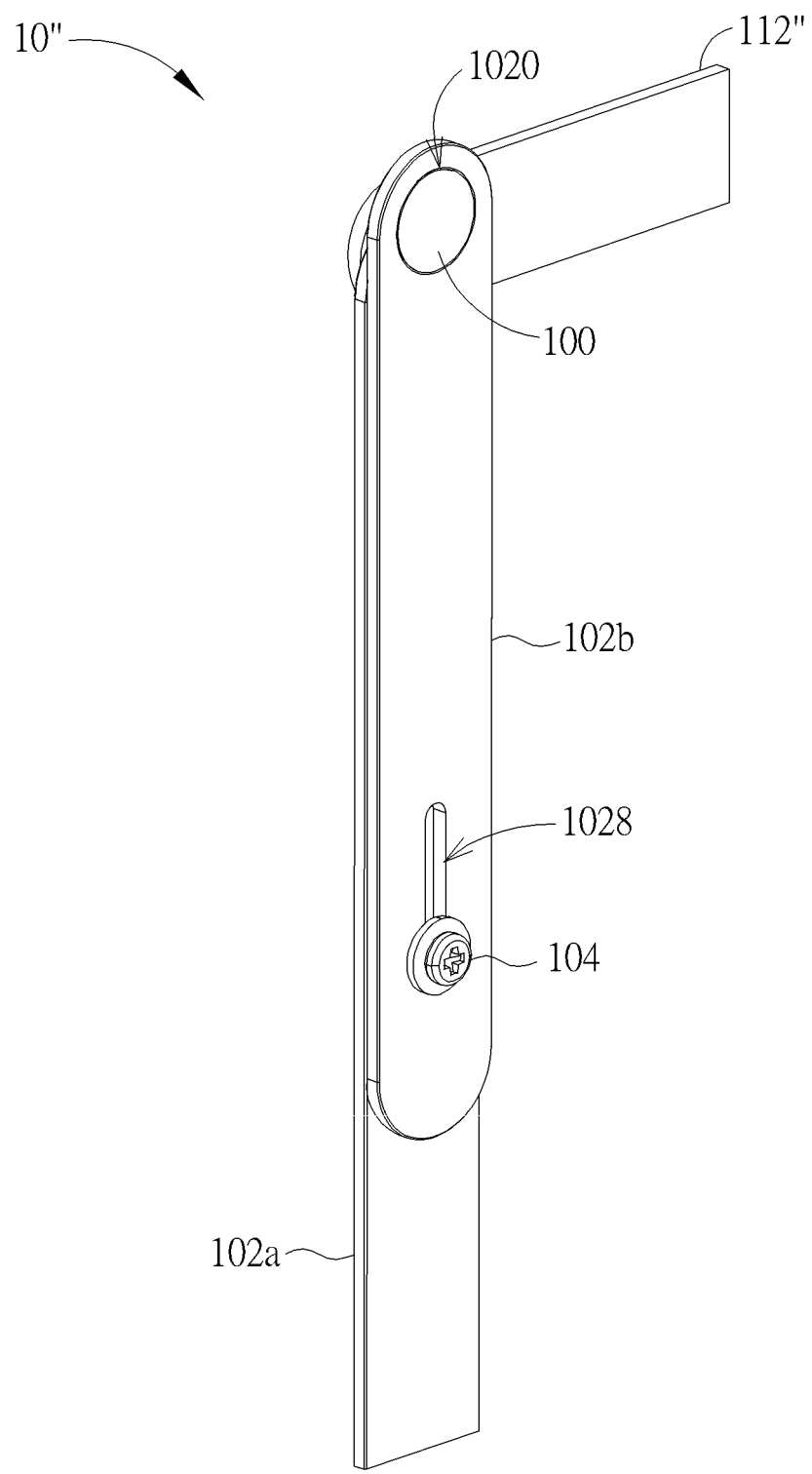
FIG. 13 is a perspective view illustrating a hinge module according to another embodiment of the invention.
Figure 14:
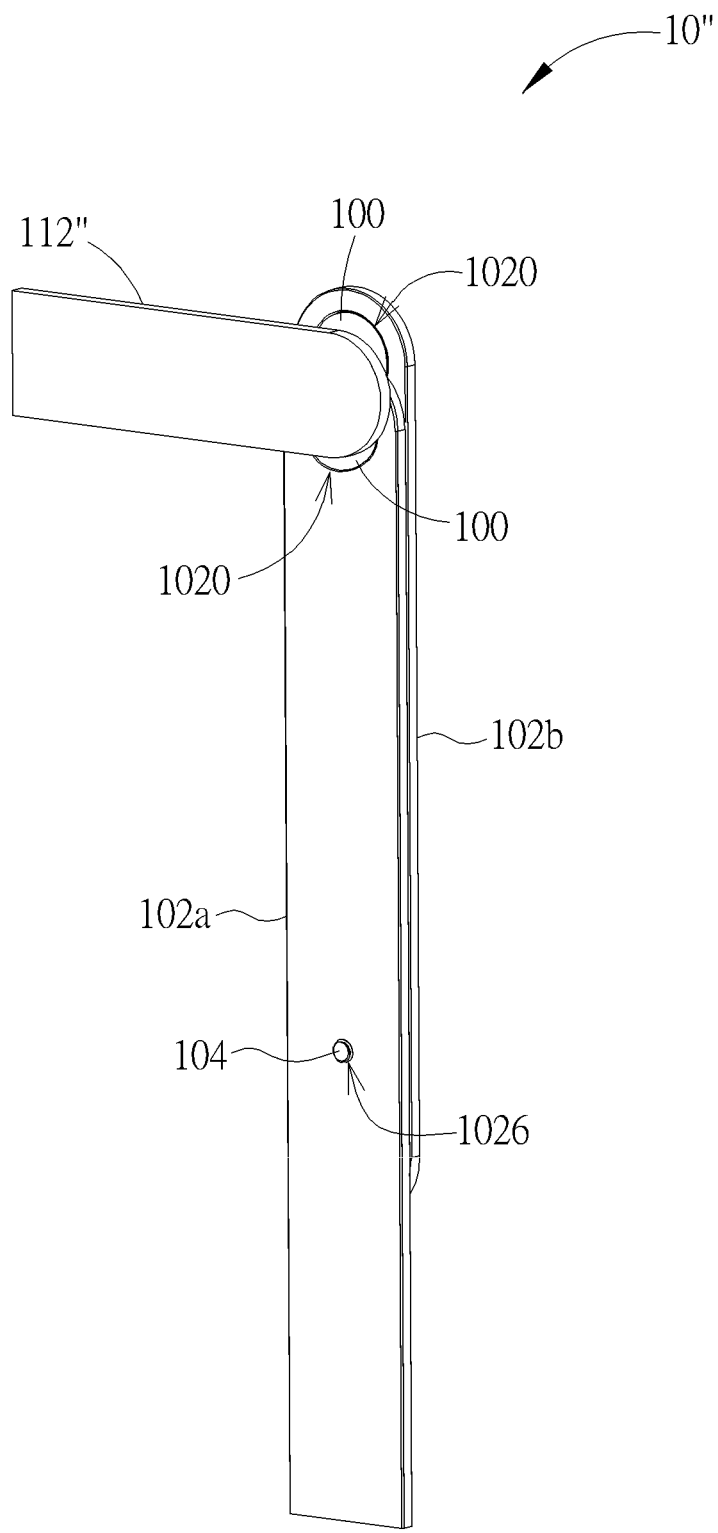
FIG. 14 is a perspective view illustrating the hinge module shown in FIG. 13 from another viewing angle.
Figure 15:
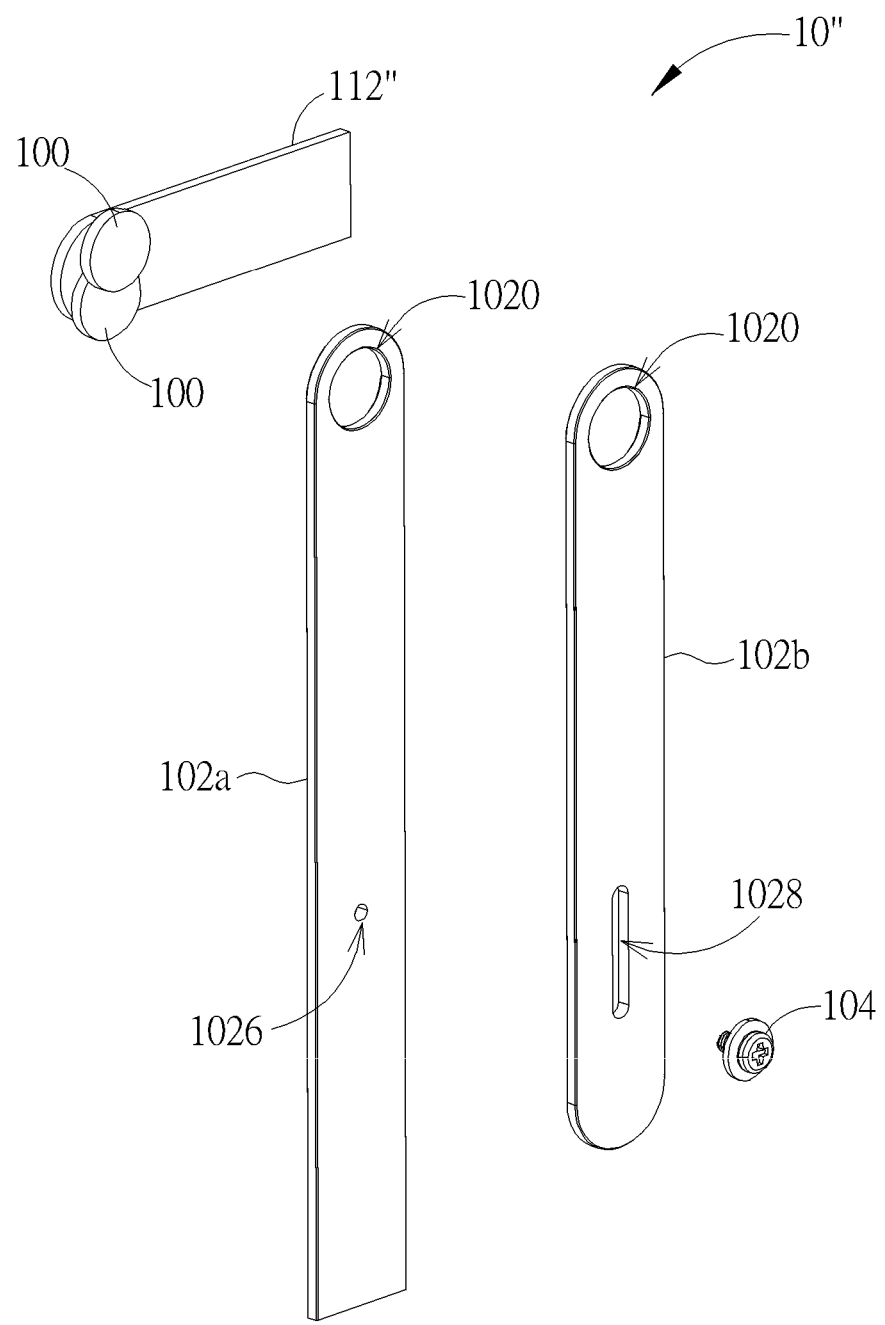
FIG. 15 is an exploded view illustrating the hinge module shown in FIG. 13.

Referring to FIGS. 13 to 15, FIG. 13 is a perspective view illustrating a hinge module 10" according to another embodiment of the invention, FIG. 14 is a perspective view illustrating the hinge module 10" shown in FIG. 13 from another viewing angle, and FIG. 15 is an exploded view illustrating the hinge module 10" shown in FIG. 13.

The main difference between the hinge module 10" and the aforesaid hinge module 10 is that the structure of the hinge module 10" is simplified. As shown in FIGS. 13 to 15, the friction plates of the hinge module 10" comprise a first friction plate 102a and a second friction plate 102b. Furthermore, two discs 100 are fixed on the support member 112" of the hinge module 10" and the two discs 100 are eccentrically connected to each other. The first friction plate 102a and the second friction plate 102b may be rotatably disposed on the two discs 100 through the circular hole 1020. In this embodiment, the first friction plate 102a has a fixing hole 1026 and the second friction plate 102b has a longitudinal hole 1028. The restraining member 104 is inserted into the longitudinal hole 1028 of the second friction plate 102b and connected to the fixing hole 1026 of the first friction plate 102a. In this embodiment, the restraining member 104 may be a screw. When the restraining member 104 fixes the first friction plate 102a and the second friction plate 102b tightly, the relative position between the first friction plate 102a and the second friction plate 102b cannot change due to the friction force therebetween. By means of the configuration between two circular holes 1020 and two discs 100, the relative position between the support member 112" and the first friction plate 102a cannot change, such that an angle included between the support member 112" and the first friction plate 102a is fixed. When the restraining member 104 is released, the friction is reduced and the first friction plate 102a and the second friction plate 102b are released, such that the angle included between the support member 112 " and the first friction plate 102a can be changed when the support member 112" is adjusted by an external force.

Therefore, according to the aforesaid embodiments, the invention may increase or decrease the number of friction plates according to the required locking force. Needless to say, the invention may also increase or decrease the width and/or length of the friction plate to adjust the locking force.

As mentioned in the above, the invention disposes the friction plates on the eccentric discs to form a crank-like structure. When an external force is exerted on both sides of the hinge module to rotate the hinge module, the friction plates are driven to move by the eccentric discs, such that a relative displacement is generated between every two adjacent friction plates. When each of the friction plates is clamped tightly from a direction perpendicular to a contact surface of the friction plate, each of the friction plates generates a friction force to resist the relative displacement, so as to resist the external force of rotating the hinge module. After the position adjustment is finished and the hinge module is released by the user, the hinge module is locked at the desired position.

The total friction force between the surfaces of two objects can be calculated by multiplying a contact force by a contact area and a coefficient of friction. In the invention, the friction surface for providing friction force is located beyond a shaft of the hinge module (i.e. the discs), so there are more space for arranging larger frictional contact area under the limitation of identical diameter and thickness of the shaft. For example, if a large locking force is required, the length of the friction plate may be increased to increase the frictional contact area, so as to provide larger friction force without increasing the diameter or axial thickness of the shaft. Furthermore, if a stable friction force without decay is required to be used for a certain period of time, the contact force of the friction surface cannot be too large, so as to prevent the friction surface from being abraded due to large friction force. When the friction area can be increased as large as possible, the contact force of the friction plate can be decreased to obtain identical total friction force. Accordingly, the invention can improve the locking force and durability of the hinge module under the limitation of identical diameter and thickness of the shaft.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A hinge module comprising:
    a plurality of discs eccentrically connected to each other;
    a plurality of friction plates, each of the friction plates having a circular hole, each of the friction plates being rotatably disposed on one of the discs through the circular hole, the friction plates contacting each other; and
    a restraining member disposed on the friction plates.

2. The hinge module of claim 1, wherein each of the friction plates has a first longitudinal hole and the restraining member is inserted into the first longitudinal hole.

3. The hinge module of claim 2, further comprising:
    two clamping members disposed at opposite sides of the friction plates, each of the clamping members having a second longitudinal hole, the restraining member being inserted into the second longitudinal hole;
    a plurality of movable members movably disposed on the clamping members; and
    two covers disposed at opposite sides of the clamping members, each of the covers having a through hole, the restraining member being inserted into the through hole, the covers having a plurality of wedge-shaped recesses, each of the movable members being accommodated in one of the wedge-shaped recesses;
    wherein when the movable member is located at a wide end of the wedge-shaped recess, the clamping members release the friction plates; when the movable member is located at a narrow end of the wedge-shaped recess, the clamping members clamp the friction plates tightly.

4. The hinge module of claim 2, further comprising:
    two clamping members disposed at opposite sides of the friction plates, each of the clamping members having a through hole, the restraining member being inserted into the through hole; and
    a plurality of connecting members configured to connect the clamping members.

5. The hinge module of claim 1, wherein the friction plates comprise a first friction plate and a second friction plate, the second friction plate has a longitudinal hole, and the restraining member is inserted into the longitudinal hole and connected to the first friction plate.

6. The hinge module of claim 1, further comprising a support member, the discs being fixed on the support member.

7. The hinge module of claim 1, wherein every two adjacent discs have an identical eccentric angle and an identical eccentric amount.

8. The hinge module of claim 1, wherein a surface of each of the friction plates has an uneven structure.

9. An electronic device comprising:
    a hinge module comprising:
        a plurality of discs eccentrically connected to each other;
        a plurality of friction plates, each of the friction plates having a circular hole, each of the friction plates being rotatably disposed on one of the discs through the circular hole, the friction plates contacting each other; and
        a restraining member disposed on the friction plates; and
    an electronic unit disposed on the hinge module.

10. The electronic device of claim 9, wherein each of the friction plates has a first longitudinal hole and the restraining member is inserted into the first longitudinal hole.

11. The electronic device of claim 10, wherein the hinge module further comprises:
    two clamping members disposed at opposite sides of the friction plates, each of the clamping members having a second longitudinal hole, the restraining member being inserted into the second longitudinal hole;
    a plurality of movable members movably disposed on the clamping members; and
    two covers disposed at opposite sides of the clamping members, each of the covers having a through hole, the restraining member being inserted into the through hole, the covers having a plurality of wedge-shaped recesses, each of the movable members being accommodated in one of the wedge-shaped recesses;
    wherein when the movable member is located at a wide end of the wedge-shaped recess, the clamping members release the friction plates; when the movable member is located at a narrow end of the wedge-shaped recess, the clamping members clamp the friction plates tightly.

12. The electronic device of claim 10, wherein the hinge module further comprises:
    two clamping members disposed at opposite sides of the friction plates, each of the clamping members having a through hole, the restraining member being inserted into the through hole; and
    a plurality of connecting members configured to connect the clamping members.

13. The electronic device of claim 9, wherein the friction plates comprise a first friction plate and a second friction plate, the second friction plate has a longitudinal hole, and the restraining member is inserted into the longitudinal hole and connected to the first friction plate.

14. The electronic device of claim 9, wherein the hinge module further comprises a support member, and the discs are fixed on the support member.

15. The electronic device of claim 9, wherein every two adjacent discs have an identical eccentric angle and an identical eccentric amount.

16. The electronic device of claim 9, wherein a surface of each of the friction plates has an uneven structure.

17. The electronic device of claim 9, wherein the electronic unit is a display module or a light emitting module.

18. The electronic device of claim 9, further comprising a support base, the support base comprising a sleeve, the friction plates being inserted into the sleeve, a side wall of the sleeve having a through hole, the restraining member being inserted into the through hole.

* * * * *